(12) United States Patent
Dutkievic et al.

(10) Patent No.: US 6,322,141 B1
(45) Date of Patent: Nov. 27, 2001

(54) SEAT COVER RETAINER

(75) Inventors: Duane Dutkievic, Erie; William Paruszkiewicz, Clinton Township, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/519,401

(22) Filed: Mar. 3, 2000

(51) Int. Cl.$^7$ ........................................................ B60N 2/58
(52) U.S. Cl. .................................. 297/218.1; 297/218.1; 297/219.1; 297/253; 24/662
(58) Field of Search ........................... 297/218.1, 218.2, 297/218.3, 219.1, 228.13, 229, 253; 24/30.55, 66.2, 662

(56) References Cited

U.S. PATENT DOCUMENTS

| 5,195,218 | * | 3/1993 | Joseph et al. ................ | 24/30.5 S X |
| 5,330,251 | * | 7/1994 | McGuire ...................... | 297/218.1 X |
| 5,918,934 | * | 7/1999 | Siegrist ........................ | 297/253 X |
| 6,030,046 | * | 2/2000 | Dorow ......................... | 297/253 X |

FOREIGN PATENT DOCUMENTS

| 0 071 388 | | 2/1983 | (EP) . | |
| 2471760 A1 | | 6/1981 | (FR) . | |
| 2472923 | * | 7/1981 | (FR) ............................. | 297/219.1 |

OTHER PUBLICATIONS

Search Report Under Section 17, May 2, 2001.

* cited by examiner

*Primary Examiner*—Peter R. Brown
(74) *Attorney, Agent, or Firm*—Brooks & Kushman P.C.

(57) ABSTRACT

A vehicle seat cover for covering a vehicle seat assembly is disclosed. The seat cover has a retainer in juxtaposition with an aperture in the seat cover. The retainer is secured to the seat cover. Moreover, the retainer is configured to removably engage a structural member attached to the vehicle seat frame thereby preventing the seat cover from disengaging from the structural member. The vehicle seat cover is assembled in the same manner as prior art seat covers with the additional step of pushing the retainer down and over the structural member.

6 Claims, 3 Drawing Sheets

SEAT COVER RETAINER

TECHNICAL FIELD

The present invention relates to retainers for removably securing seat covers to vehicle seats.

BACKGROUND ART

During the assembly of a vehicle seat, a seat cover must be stretched and positioned around a seat frame and seat cushion. As the seat cover is positioned by an assembly operator, typically there are various seat components or members which must be fitted through apertures formed in the seat cover. If the seat member slips out of the apertures in the seat cover, the assembly operator must reposition the seat cover around the seat frame. This repositioning causes increased assembly time and a corresponding increase in assembly costs.

Of course, it would be desirable to reduce assembly time and cost for assembling vehicle seats by providing a device which aligns and positions seat members through apertures in the seat cover. The device must prevent the seat member and the seat cover from becoming disassembled and requiring further manipulation by the assembly operator.

DISCLOSURE OF INVENTION

Accordingly, an object of the present invention is to provide a retainer for a vehicle seat cover for preventing an aperture in the seat cover from disassembling from a structural member attached to a seat frame.

In accordance with this and other objects, the present invention provides a vehicle seat cover for covering a vehicle seat assembly. The seat cover has a retainer in juxtaposition with an aperture in the seat cover. The retainer is secured to the seat cover. Moreover, the retainer is configured to removably engage a structural member attached to the vehicle seat thereby preventing the seat cover from disengaging from the structural member. The vehicle seat cover is assembled in the same manner as prior art seat covers with the additional step of pushing the retainer down and over the structural member.

In accordance with another aspect of the present invention an retainer having a plurality of apertures for engaging a structural member attached to a seat frame is provided.

In accordance with still another aspect of the present invention the retainer is sewn onto the elongated material.

In accordance with still another aspect of the present invention the retainer further comprises a locking flap for further preventing the seat frame from disengaging the seat cover.

In accordance with still another aspect of the present invention the retainer further comprises a plurality of notches disposed on a perimeter of the retainer for locating and positioning the retainer in juxtaposition with an aperture in the seat cover.

In accordance with yet another aspect of the present invention a retainer comprised of ABS plastic is provided.

The above features, benefits and advantages and other features, benefits and advantages of the present invention are readily apparent from the following detailed description of the best mode for carrying out the invention when taken together with the accompanying drawings.

BEST MODE FOR CARRYING OUT THE INVENTION

Figure 1:
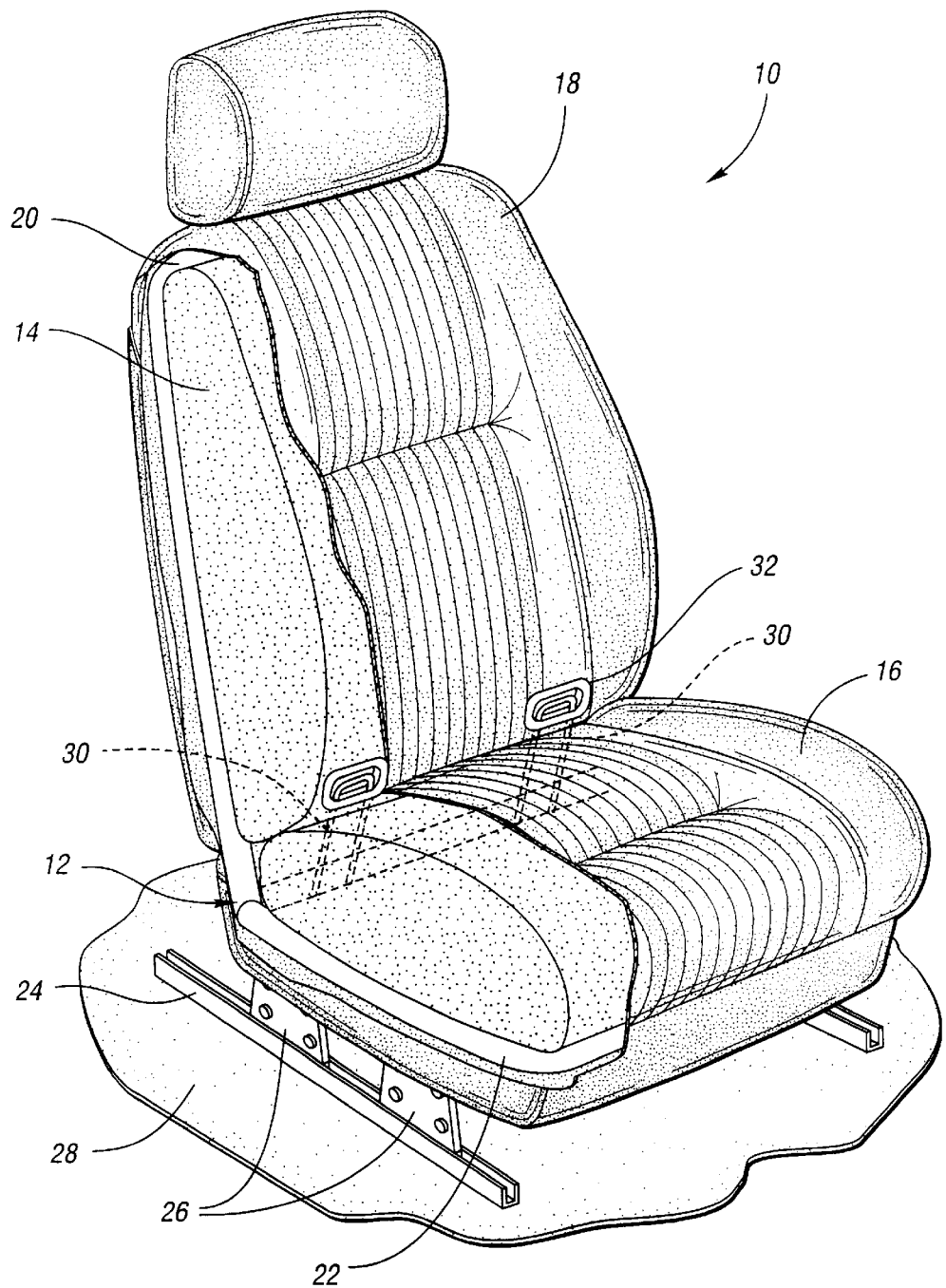
FIG. 1 is a perspective view of a vehicle seat having a structural member and a seat positioned thereon, according to the present invention.

Referring now to FIG. 1, a vehicle seat assembly 10 is illustrated. The vehicle seat assembly 10 includes a seat frame 12, a seat back cushion 14, a seat bottom cushion 16, and a seat cover 18. The seat frame 12 includes a seat frame back portion 20 and a seat frame bottom portion 22. Seat frame bottom portion 22 is generally secured to a seat track 24 by a plurality of brackets 26. Seat track 24 is typically mounted to a vehicle structure such as a vehicle floor 28. The seat frame bottom portion 22 includes generally a pair of structural members 30 which are fixed to either the frame back portion 20, the frame bottom potion 22 or both.

The structural members 30 have generally a U-shaped configuration and are designed to removably receive a child seat. This childseat anchoring methodology is generally know in the art as "Isofix". An Isofix child seat anchoring system allows all child seat manufactures to configure their child seats to attach to Isofix bars such as structural members 30. This eliminates the need to secure a child seat with a seatbelt and insures that the child seat is properly fixed to the vehicle seat.

Generally, structural members 30 are positioned between the seat back and seat bottom cushions and dimensioned so that a top portion of the structural member is flush with the seat bottom cushion. This insures that structural members are visible to attach a child seat thereto and not interfere with a seated vehicle occupant when the child seat is not present.

However, the inclusion of structural members 30 creates vehicle seat assembly difficulties. During assembly of the vehicle seat, an assembly operator must stretch and position the seat cover over the frame back portion 20 and the seat bottom portion 22. The structural members 30 must be directed through seat cover apertures 32 to expose the top portion of the structural members 30 to individuals installing child seats and provide access thereto.

Figure 2:
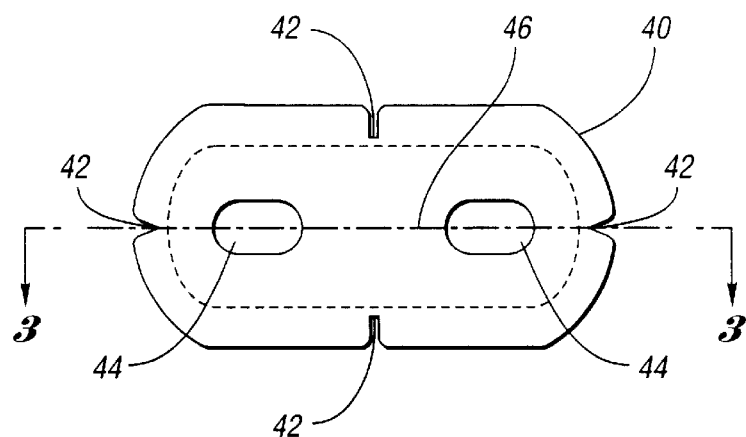
FIG. 2 is a perspective view of a retainer, in accordance with the present invention.

Referring now to FIG. 2, a retainer 40 is shown according to the present invention. In order to prevent the structural members 30 from sliding back through cover apertures 32 retainer 40 is attached to a rear surface of the seat cover 18. Retainer 40 is, preferably, comprised of a flexible and resilient plastic material such as ABS. The specific configuration of retainer 40 is described in detail below.

The retainer 40 has a generally elongated body having a plurality of notches 42 disposed around a perimeter to aid in locating and positioning the retainer on the seat cover. Preferably, retainer 40 is stitched around its perimeter for securing the retainer to the seat cover. Retainer 40 further has pair of oblong apertures 44 sized to receive structural member 30. Additionally, the retainer 40 has a material break 46 extending between the oblong apertures 44 allowing the retainer to flex and slide over the structural member 30, as illustrated in FIG. 3.

Figure 3:
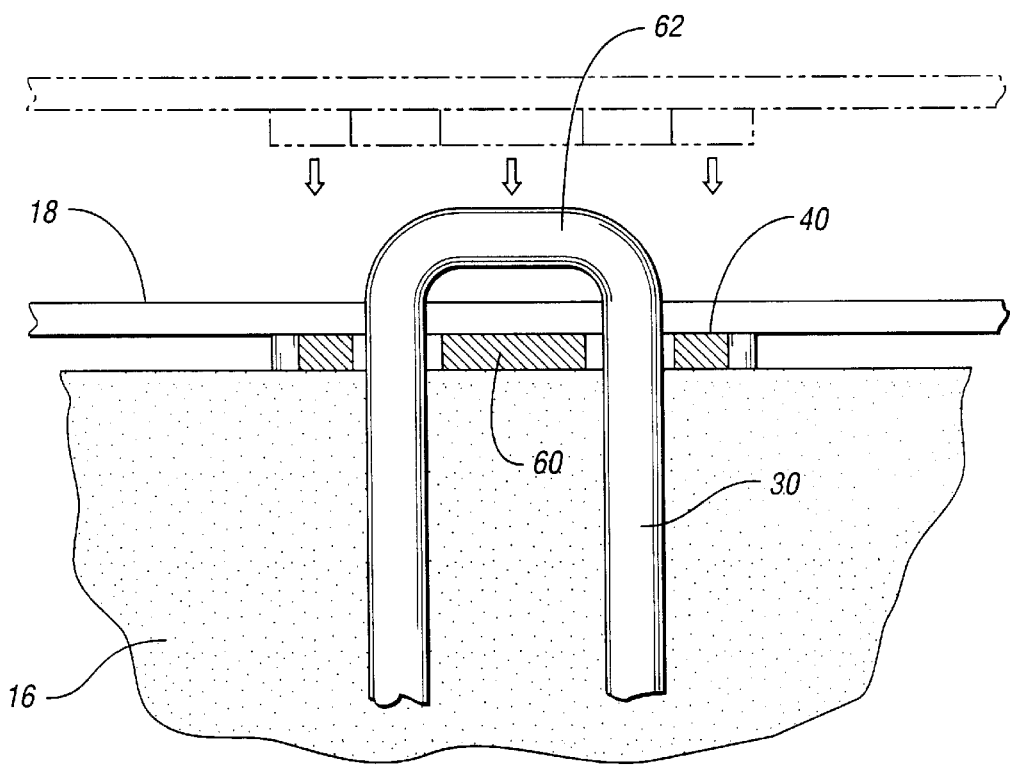
FIG. 3 is a cross-sectional view of the retainer attached to the seat cover and engaged with the structural member, in accordance with the present invention.

With specific reference now to FIG. 3, a cross-sectional view of retainer 40 attached to seat cover 18 and engaged with structural member 30 is illustrated, in accordance with the present invention. As indicated by the arrows the seat cover 18 having retainer 40 secured thereto is pressed down and over structural member 30. Retainer 40 further pushed onto structural member 30 thereby opening the material break 46 allowing middle portion 60 of retainer 40 to travers structural member top portion 62. In an engaged position middle portion 60 is disposed beneath the structural member top portion 62 and material break returns to its original closed position. The subsequent interference contact of middle portion 60 with structural member top portion 62 prevents disengagement of retainer 40 from structural member 30.

Figure 4:
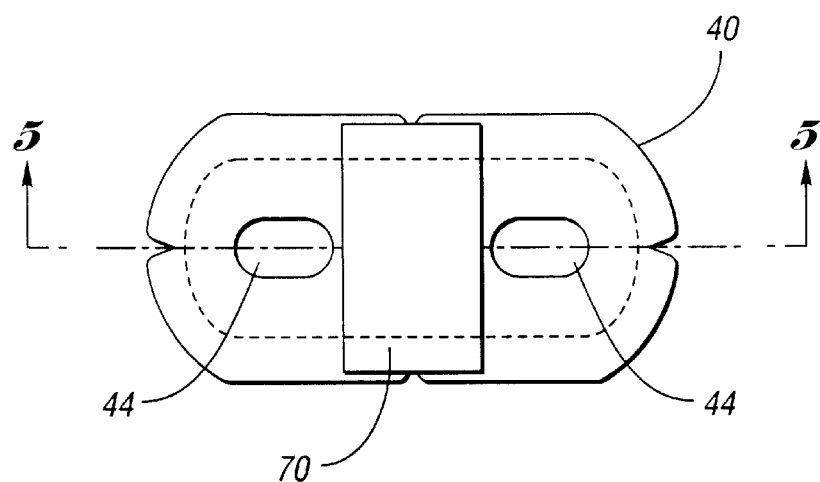
FIG. 4 is a perspective view of a retainer having a locking flap, in accordance with the present invention.
Figure 5:
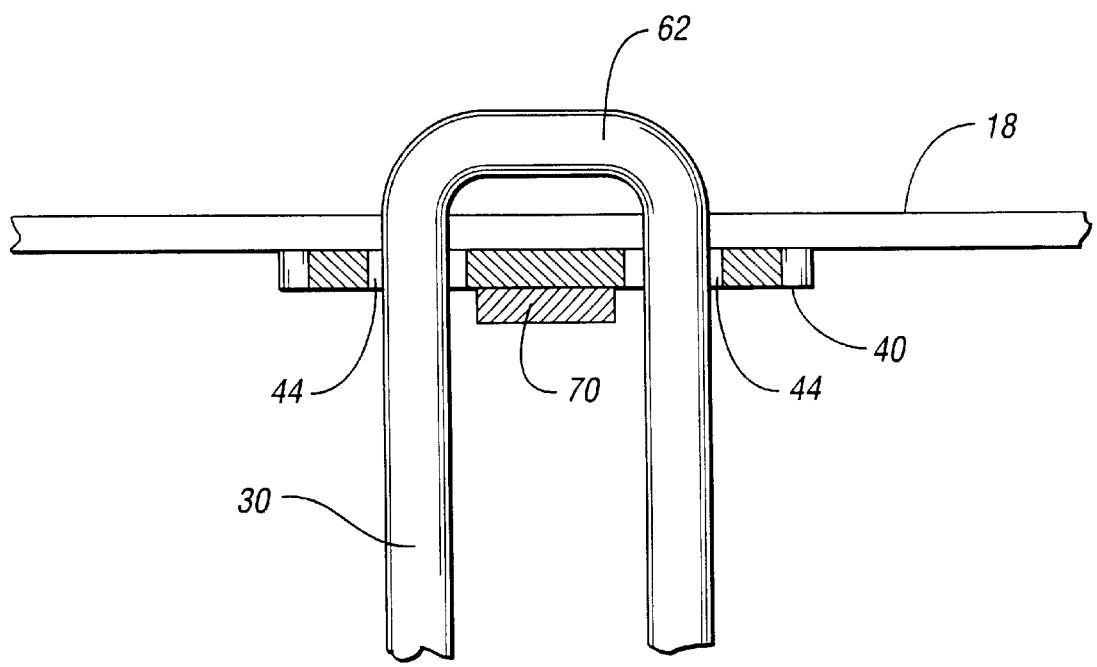
FIG. 5 is a cross-sectional view of the retainer and the locking flap attached to the seat cover and engaged with the structural member, in accordance with the present invention.

In an alternative embodiment retainer 40 includes a locking flap 70 as illustrated in FIGS. 4 and 5, in accordance with the present invention. Locking flap 70 has a generally rectangular elongated shape. Preferably, locking flap 70 is sewn on top of retainer 40 after retainer 40 is sewn to seat cover 18. Locking flap 70 is configured to lie against material break 46 and seat bottom cushion 16. In this position locking flap 70 acts to prevent retainer 40 from disengaging from structural member 30. Locking flap 70 has been shown to be especially useful in preventing disengagement of retainer 40 from structural member 30 when structure member 30 moves relative to seat bottom cushion 16. As with the embodiment without locking flap 70 the seat cover positioned around the seat frame and seat cushions and then retainer 40 is pushed down and onto structural member 30. Retainer 40 is further depressed onto structural member 30 until locking flap 70 traverse and is positioned underneath structural member top portion 62.

In an alternative embodiment, retainer 40 is secured to seat cover 18 by a heat sealing process.

Accordingly, it is readily apparent from the above disclosure that the present invention offers many advantages and benefits over the prior art. For example, the present invention reduces the vehicle seat assembly time and associated assembly costs by preventing the retainer from disengaging from the structural member after it is assembled. Further, the retainer my be easily reconfigured to engage structural members have different cross sectional shapes. Moreover, the present invention keeps the structural member visible and readily accessible to child seat installers make the installation of the child seat quick and easy.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
    a seat frame for supporting a vehicle occupant and including an upstanding structural seat member configured to engage a child seat;
    a seat cushion in juxtaposition with the seat frame for isolating the vehicle occupant from the seat frame;
    a seat cover having at least one aperture therein to recieve the upstanding structural seat member and the seat cover being configured to enshroud the seat cushion and seat frame; and
    a retainer attached to the seat cover adjacent the at least one aperture for preventing the seat cover from disengaging from upstanding structural seat member.

2. The vehicle seat assembly of claim 1, wherein the retainer has a break line for allowing the retainer to bend and receive a structural seat member attached to the seat frame.

3. The vehicle seat assembly of claim 1, wherein the retainer is stitched onto the seat cover for securing the retainer thereto.

4. The vehicle seat assembly of claim 2, wherein the retainer further comprises a locking flap configured to lie against the break line for preventing the seat frame from disengaging the seat cover.

5. The vehicle seat assembly of claim 1, wherein the retainer further comprises a plurality of notches disposed on a perimeter of the retainer for locating and positioning the retainer in juxtaposition with the at least one aperture in the seat cover.

6. The vehicle seat assembly of claim 1, wherein the retainer is comprised of ABS plastic.

\* \* \* \* \*